United States Patent [19]
Apostoleris

[11] 3,766,418
[45] Oct. 16, 1973

[54] PERMANENT MAGNET DYNAMOELECTRIC MACHINE FLUX PATH ASSEMBLY

[75] Inventor: Theodore G. Apostoleris, Ann Arbor, Mich.

[73] Assignee: Ford Motor Company, Dearborn, Mich.

[22] Filed: Nov. 15, 1972

[21] Appl. No.: 306,777

[52] U.S. Cl. .................. 310/154, 310/42, 310/46
[51] Int. Cl. .......................................... H02k 21/26
[58] Field of Search ............... 310/40 R, 40 MM, 310/42, 43, 46–49, 154, 155

[56] References Cited
UNITED STATES PATENTS

| | | | |
|---|---|---|---|
| 3,023,332 | 2/1962 | St. Charles | 310/42 X |
| 3,401,281 | 9/1968 | Martin et al. | 310/42 |
| 3,489,937 | 1/1970 | Maher et al. | 310/154 |
| 3,521,096 | 7/1970 | Merriam | 310/154 |
| 3,631,277 | 12/1971 | Ferdig | 310/154 |

*Primary Examiner*—D. F. Duggan
*Assistant Examiner*—Mark O. Budd
*Attorney*—Keith L. Zerschling et al.

[57] ABSTRACT

A flux path assembly for association with the plastic housing of a dynamoelectric machine using externally situated permanent magnets is disclosed. The assembly is comprised of at least two flux path members arranged in surrounding relationship with respect to the permanent magnets and the housing and which are retained in position by the cooperative association of at least two spring clip members and at least two inwardly projecting tabs arranged to engage with spaces provided therefor on the surface of the plastic housing. The spring clip member is provided with serrations or teeth arranged along convergent facing edges to engage outwardly projecting tabs on the flux path members and is provided with an inwardly projecting deformable segment to prevent overstressing of the plastic housing.

9 Claims, 6 Drawing Figures

PATENTED OCT 16 1973
3,766,418
SHEET 1 OF 2
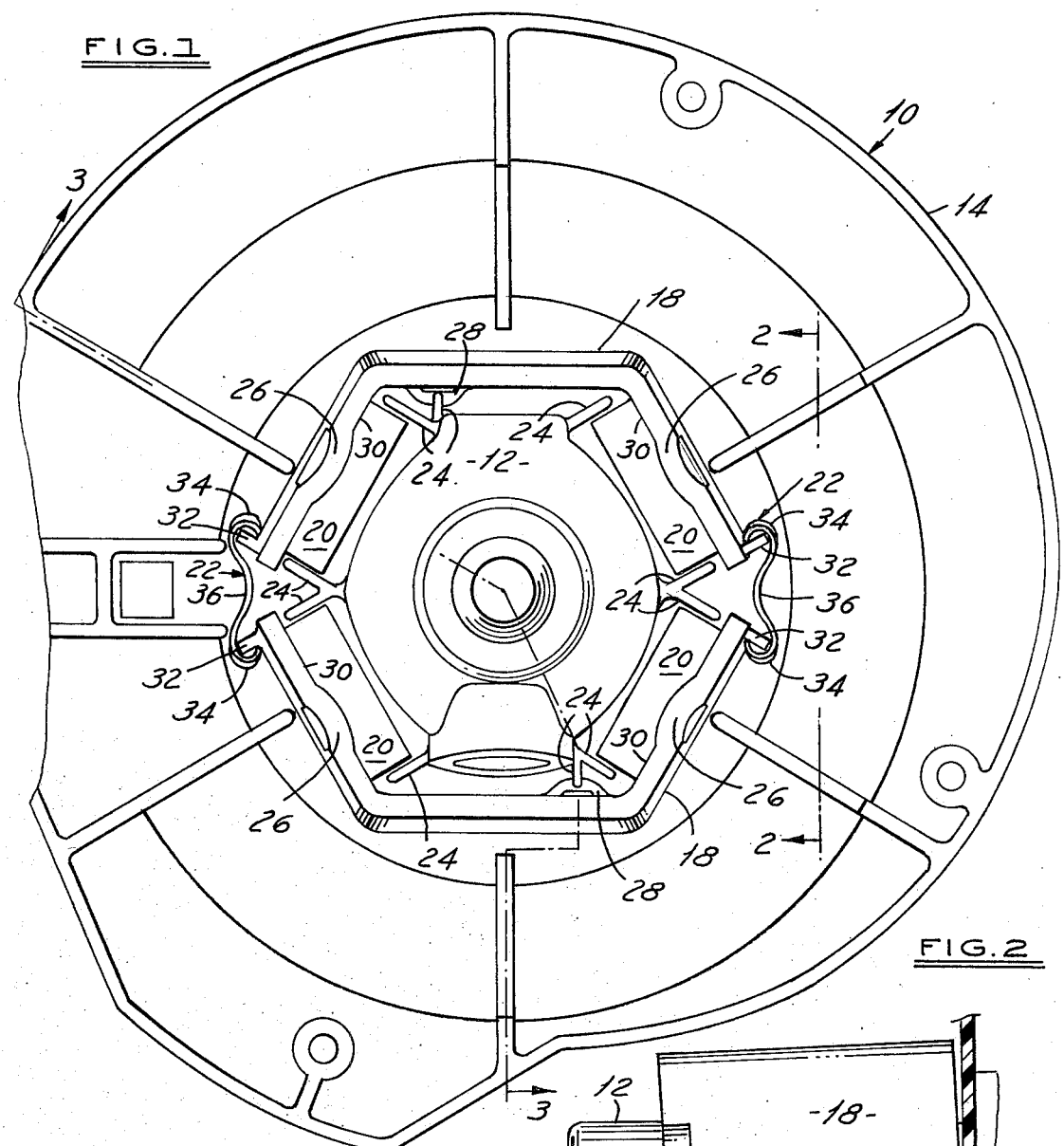
FIG.1
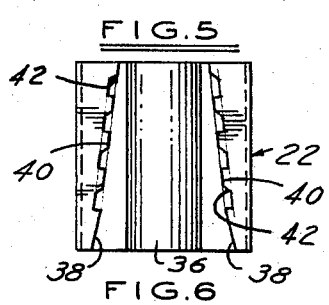
FIG.5
FIG.6
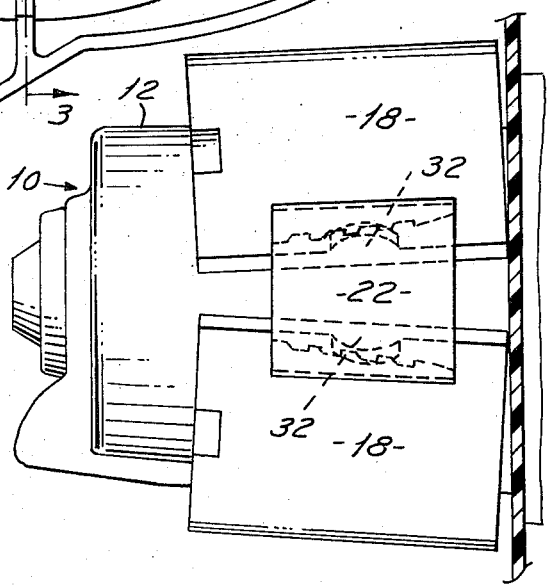
FIG.2

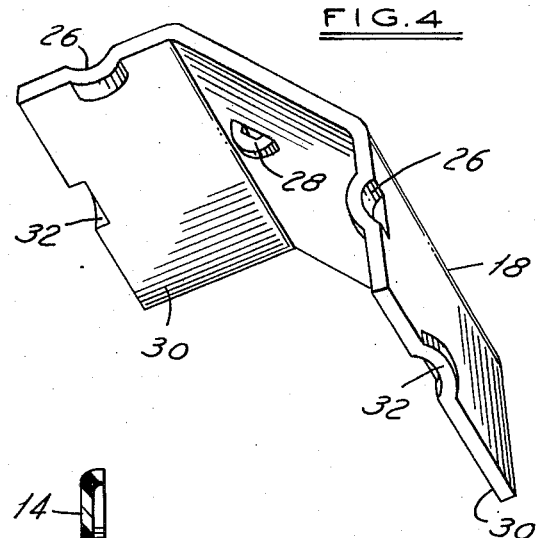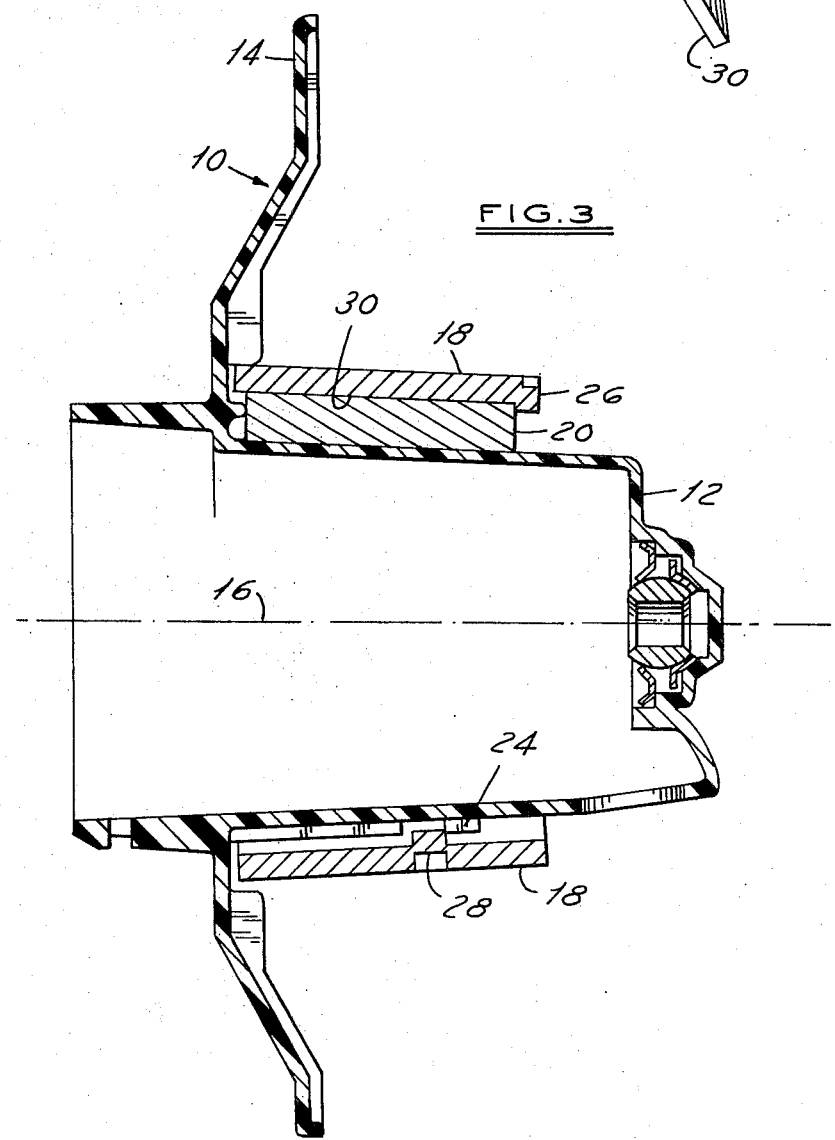

PERMANENT MAGNET DYNAMOELECTRIC MACHINE FLUX PATH ASSEMBLY

CROSS REFERENCE TO RELATED APPLICATION

The instant application is related to the co-pending commonly assigned patent application Ser. No. 223,636 filed on behalf of Arthur J. Macoit and Theodore G. Apostoleris entitled "Permanent Magnet Dynamoelectric Machine" filed on Feb. 4, 1972.

BACKGROUND OF THE INVENTION

Field Of The Invention

The present invention is related to the field of permanent magnet dynamoelectric machines and in particular to that portion of the above noted field in which the permanent magnets and the flux path members are assembled in surrounding relationship to a molded plastic housing which interiorly receives the rotor or armature structure.

Description of the Prior Art

As illustrated in the noted co-pending application, the prior art teaches that a plurality of permanent magnets may be confined between a somewhat conical, cup-shaped plastic housing and a ferromagnetic flux path member. In turn, a plurality of flux path members may be rigidly attached or mounted to the housing by means of screws passing through the flux path members and threadedly received by the plastic housing or by threaded fasteners within or attached to the housing. To further aid in the retention of the permanent magnets, a plurality of longitudinally extending rib structures may be formed in the plastic housing to establish the circumferential position of the permanent magnets while the longitudinal position of the permanent magnets may be defined by an extending flange member of the housing on one side and downwardly projecting tabs formed on the flux path member during its manufacture on the other side. This results in a satisfactory technique for constructing the flux generating portion of a stator of a dynamoelectric machine but also results in a technique requiring a relatively expensive plastic housing which of necessity must include threaded portions formed in the plastic housing during its molding stage or means for receiving threaded fasteners. Both of these techniques add cost to the housing as well as requiring a screw assembly technique which adds man hour cost to the assembly of the finished motor. These extra increments of cost tend to make the dynamoelectric machine less attractive to manufacture and hence less competitive.

A further difficulty has arisen due to the fact that a precise placement of the threaded portion of the plastic housing and the hole passing through the flux path member is required in order to avoid an unfavorable tolerance buildup situation which could result in greater stress being applied to some portions of the plastic housing ultimately causing that housing to fail. In order to avoid this specific problem, the hole through the flux path member may be enlarged to accept tolerance variations but this necessitates over sized heads on the screws or the use of washers, both of which tend to increase material and assembly cost. Other straight forward solutions to this problem are also seen to result in a net increase in the material and-/or the labor costs associated with the assembly of the finished dynamoelectric machine. It is, therefore, a specific object of the present invention to provide a flux path assembly for a dynamoelectric machine having a plastic housing and exteriorly positioned permanent magnets which does not require the formation or the addition of threaded screw fasteners within or through the plastic housing. It is also a specific object of the present invention to provide such an assembly which is self compensating for tolerance variations.

SUMMARY OF THE INVENTION

The present invention satisfies the above stated objectives by providing the flux path members with outwardly projecting tab means or ears which are positioned to be in a confronting relationship when a plurality of flux path members are arranged end-to-end so as to be in a surrounding relationship with respect to the dynamoelectric machine housing. Resilient clip means are provided to engage pairs of confronting tab means so as to resiliently bias these pairs together thereby providing for a compressive action of the flux path assembly about the housing. This circumferentially acting compressive force causes the flux path members to be self centering about the housing by accepting any tolerance variations which may exist between the sizes of the various flux path members and the housing. The clip member is provided with a pair of facing edges each containing serrations so as to forceably grip the outwardly projecting tab means of the various flux path members. The facing edges of the clip means are arranged to be nonparallel to facilitate assembly whereby the wider end of the clip member may be initially applied to the projecting tab means and the clip member may then be forceably moved in the longitudinal direction so that continually narrowed spacing exists between the portion of the clip edges in contact with the projecting tabs. To ease assembly and make removal more difficult, the serrations are tapered on their inner edges. The clip member is also provided with an inwardly projecting U-shape segment which is deformable under force to maintain the serrations in gripping contact with the outwardly projecting tab means and to concomitantly accept any tolerance variations between the flux path members. The nonparallel clip edges aid in compensating for tolerance variations by being operative over their entire lengths. An inwardly projecting tab member is provided on each of the flux path members for receipt by a discontinuity provided in at least one of the normally provided housing ribs to establish the longitudinal position of the flux path assembly.

BRIEF DESCRIPTION OF THE DRAWINGS

FIG. 1 shows an elevational view of a dynamoelectric machine housing having a presently preferred form of flux path assembly according to the present invention.

FIG. 2 shows a sectional view, taken along line 2—2 of FIG. 1, showing the flux path assembly of the present invention in a side elevational view.

FIG. 3 shows a sectional view, taken along the line 3—3 in FIG. 1 showing the flux path assembly of the present invention in a section view.

FIG. 4 shows a flux path member of the present invention in a perspective view.

FIGS. 5 and 6 show a flux path clip member according to the present invention in two elevational views.

DETAILED DESCRIPTION OF THE PREFERRED EMBODIMENT

Referring now to the drawing, wherein like numerals designate the same element in the various Figures, FIGS. 1, 2 and 3 show various views of a dynamoelectric machine housing 10 incorporating the flux path assembly of the present invention. Housing 10 has a generally axially or longitudinally extending cup shaped portion 12 and a generally radially extending mounting flange portion 14. As particularly illustrated in FIG. 3, the housing 10 is of a molded plastic material with the cup shaped portion 12 having a slight axial or longitudinal taper. By "axial or longitudinal" is meant the general direction of the axis of rotation of an armature when inserted within the cup shaped portion 12 while "radial" refers to a direction generally perpendicular to the axial direction. The axial or longitudinal direction is denoted in FIG. 3 by the line 16.

The flux path assembly according to the present invention is comprised of a pair of flux path members 18 formed of a highly permeable ferromagnetic material such as iron, a plurality of permanent magnet members 20 and a pair of clip members 22 formed preferably of a resilient or spring steel. Clip members 22 are operative to hold, in cooperation with the exterior surface of the cup shaped portion 12, the flux path assembly in assembled relationship. Cup shaped housing 12 is provided with a plurality of longitudinal extending rib members 24 which are operative to define a plurality of circumferential positions for receipt of the permanent magnets 20.

Referring now to FIG. 4, a flux path member 18 is illustrated in a perspective view. Flux path member 18 is provided with a pair of downwardly, or radially inwardly, projecting tabs or protuberances 26 which are operative to define, in cooperation with a portion of the housing 10, the axial position of the permanent magnet members 20 with which the flux path member 18 is to be associated. Flux path member 18 is further provided with a downwardly or radially inwardly projecting tab or protuberance 28 extending from the central portion of the flux path member 18. With particular reference to FIG. 3, it can be seen that tab 28 is operative to engage a discontinuity or slot provided therefor in one of the longitudinally extending rib members 24 so as to axially define the position of the flux path member 18 with respect to the exterior surface of the cup shaped portion 12 of the housing 10.

Again with particular reference to FIG. 4, flux path member 18 is also comprised of a pair of end portions 30 having radially inner surfaces which are contoured to intimately receive one surface of a permanent magnet member 20. In this instance, the permanent magnet members 20 are illustrated as being of flat plate block construction so that the end segment inner surfaces 30 of each of the flux path member 18 are also of flat or planar configuration. At the circumferentially remote ends of each flux path member 18 there is provided an axially centrally located radially outwardly extending tab or protuberance 32. The outwardly extending tabs 32 are arranged to be in a mutually confronting relationship when a plurality of flux path members are arranged in a surrounding relationship with respect to the cup shaped portion 12 of a dynamoelectric machine housing 10. The outwardly projecting tabs or protuberances 32 are provided to be forceable gripped by clip member 22 to maintain the flux path assembly according to the present invention in assembled relationship. The flux path member 18 as above described may be conveniently provided with the desired shapes and protuberances in a single forming operation such as a stamping operation.

Referring now to FIGS. 1, 5 and 6 and in particular to FIGS. 5 and 6, the clip member 22 according to the present invention is described. Clip member 22 is comprised of a pair of confronting, generally C-shaped segments 34 and a central, radially inwardly projecting U-shaped segment 36. Each of the end segments 34 has a free edge 38 which is provided with a plurality of serrations or teeth 40. The free edges 38 of the clip member 22 are arranged to be nonparallel and the purpose of this nonparallility will be described hereinbelow. The free edges are arranged to be longitudinally convergent in a direction opposite the direction of assembly or away from the housing.

The flux path assembly according to the present invention may be placed into assembled relationship by positioning the housing member 10 so that the axial direction substantially coincides with the vertical direction with the cup shaped portion 12 directed upwardly. The requisite number of flux path members 18 may be loosely positioned about the periphery of cup shaped portion 12 so that the downwardly projecting tabs 28 are approximately positioned to coincide with the discontinuities or slots provided therefor in rib members 24. Permanent magnet members 20, preferably in a non-magnetic or uncharged condition, may then be loosely positioned between the end surfaces 30 of the flux path members 18 and the cup shaped portion 12. The widest portion of the opening between the edges 38 of the clip members 22 may then be inserted over the outwardly projecting tabs 32 of the flux path members 18 and may be moved in a generally axial direction to forceably grip the outwardly projecting tabs 32. Due to the resilient nature of clip member 22, this will have the effect of deflecting the U-shaped central portion thereof and exerting a circumferentially directed compressive force between adjacent flux path members 18.

As the circumferentially acting compressive force acting upon the flux path members 18 increases, the properly shaped inner surfaces 30 of each of the end segments of the flux path members 18 will be brought into intimate engagement with the mating surface of a permanent magnet member 20 so as to compressively confine a permanent magnet member 20 between a portion of a flux path member 18 and the exterior surface of the cup shaped portion 12. Further movement in the axial direction of the clip members 22 will result in increasing the compressive force being circumferentially applied between adjacent flux path members. It will be appreciated that as the clip members 22 are moved in the axial direction, there will be an increasing resistance to this movement caused by the cutting action of the teeth or serrations acting on the outwardly projecting tabs 32. Cessation of axial movement of the clip members 22 when an established level of resistance to movement is reached can readily be provided and the established level of resistance can be predetermined to be sufficient to maintain the flux path assembly in assembled relationship in the presence of extreme vibration. While the flux path assembly according to the present invention is being maintained in assembled relationship, inwardly projecting tab members 28 cooperating with the recess provided therefor in the rib members 24 will be operative to maintain the axial position of the flux path assembly with respect to the cup shaped housing 12. Furthermore, the downwardly projecting tabs 26 will be operative to confine the permanent magnet within the flux path assembly.

By providing each of the clip members 22 with a pronounced tapering of the facing free edges 38, the clip members 22 are able to readily compensate for any dimensional variations between adjacent flux path members and between the flux path members and the cup shaped portion 12 of the housing 10. By providing the teeth or serrations 40 with a taper as at 42 relative to free edges 38 which is also convergent in the same direction as the free edges, but of course at a greater angle to the longitudinal direction, the clips 22 may be easily applied to complete a flux path assembly according to the present invention. The taper 42 aids in spreading the clips 22 during assembly while the trailing edges or corners forceably grip, and cut into, the projecting tabs 32 upon any attempted removal of the clips 22. By way of example, a removal force of four times the assembly force can be readily obtained. Furthermore, by providing the clip members 22 with an inwardly projecting U-shaped segment 36, deflection of the various clip segments caused by the assembly step will always result in the edges 38 maintaining a confronting relationship so that the serrations 40 will forceably grip the outwardly projecting tabs 32 and deflection of the clip members will not greatly alter the confronting relationship. By providing the clip members 22 to operate upon the confronting ends of adjacent flux path members, the flux path assembly according to the present invention will be self centering about the axis 16 in such a manner that the compressive forces generated by the flux path assembly will be evenly distributed about the circumference of the cup shaped portion 12 avoiding any concentration of forces of which could lead to a housing failure. It will thus be seen that the present invention readily accomplishes its stated objects and does so in a manner which decreases the cost of manufacture and/or assembly of a dynamoelectric machine in as much as it has eliminated the necessity for the provision of threaded passageways within or through the plastic material of the housing 10 and has done so without the addition of significant material or highly accurate components.

What I claim is:

1. A dynamoelectric machine flux path assembly for cooperative association with a plurality of permanent magnets and the exterior of a cup shaped housing comprising:

at least two generally arcuate shaped ferromagnetic flux path members having inner surfaces facing the housing and portions of said surfaces adapted for intimate contact with the permanent magnets, said flux path members having facing end portions with outwardly projecting tab means extending therefrom; and at least two spring clip members each interconnecting adjacent tab means of two flux path members operative to resiliently bias the facing ends of said flux path members together and cooperative with the housing to compressively confine the permanent magnets between the housing and said flux path members.

2. The assembly of claim 1 wherein the housing includes a plurality of outwardly facing longitudinal rib portions, at least two of which are discontinuous, the discontinuities being located intermediate the ends thereof and each of said flux path members further includes at least one inwardly projecting tab means operative to be received by the discontinuities to establish a longitudinal position of said flux path members relative to the housing.

3. The assembly of claim 2 wherein said flux path members comprise unitary ferromagnetic members having the inwardly and outwardly projecting tab means formed therein.

4. The assembly of claim 1 wherein each of said clip members comprises a unitary resilient portion having a pair of facing C-shaped segments and an interconnecting segment, the generally longitudinal free edges of each of the C-shaped segments being provided with facing serrations operative to engage said flux path member outwardly projecting tab means.

5. The assembly of claim 4 wherein said interconnecting segment comprises a resiliently deformable inwardly projecting generally U-shaped segment.

6. The assembly of claim 4 wherein the free edges of the clip member are nonparallel.

7. The assembly of claim 6 wherein the free edges are arranged to longitudinally converge away from the housing.

8. The assembly of claim 7 wherein the facing serrations are each provided with a taper which is longitudinally convergent in the same direction as the free edges.

9. The assembly of claim 8 wherein said interconnecting segment comprises a resiliently deformable inwardly directed generally U-shaped segment, said U-shaped segment being deformable without altering the confronting relationship of the serrations.

* * * * *